March 30, 1965  E. MITTMAN  3,176,058
EMBOSSED MATERIAL AND METHOD AND APPARATUS OF PRODUCING SAME
Filed Oct. 31, 1960

INVENTOR.
EMANUEL MITTMAN
BY Lester W. Clark
ATTORNEY

United States Patent Office 3,176,058
Patented Mar. 30, 1965

3,176,058
EMBOSSED MATERIAL AND METHOD AND
APPARATUS OF PRODUCING SAME
Emanuel Mittman, Forest Hills, N.Y., assignor, by mesne assignments, to W. R. Grace & Co., New York, N.Y., a corporation of Connecticut
Filed Oct. 31, 1960, Ser. No. 66,307
4 Claims. (Cl. 264—284)

This invention relates to embossed material and to a method and apparatus for embossing. More particularly, this invention relates to an improved embossing method wherein relatively soft material is pressed into contact with a relatively hard embossing surface. Still more particularly, this invention relates to an improved method and apparatus for carrying out the embossing of sheet or film material wherein said material to be embossed in passed between a rotating embossing roll, the cylindrical surface of which is contoured for embossing, and a pressing or back-up roll which serves to press the material to be embossed against the embossing roll for embossing contact therewith. Still more particularly, this invention relates to an embossed material having improved definition and embossed surface characteristics more closely corresponding to and matching the embossing surface of the embossing tool employed, as well as an improved method and apparatus for forming such improved embossed material. This invention is an improvement on the embossing operation disclosed in copending, coassigned U.S. patent application Serial No. 56,036, filed September 14, 1960 in the name of Unokichi Takai, now U.S. Patent No. 3,141,051.

In an embossing operation it is desirable that the embossed material exactly or substantially exactly match or correspond to the embossing surface of the embossing tool.

Heretofore it has been the practice to control the embossing operation, particularly the speed of the embossing roll and/or the duration or length of time of embossing contact of the material to be embossed with the embossing surface, to assure a satisfactory, accurate and complete embossing operation. This usually has necessitated slowing down the embossing operation with a proportional reduction in output of the finished, embossed product. However, in some instances, slowing down the embossing operation to provide a prolonged embossing contact is not practical since the time for embossing contact to give an accurate, satisfactory, matching embossed product may be too great for a profitable commercial operation.

Accordingly, it is an object of this invention to provide an improved embossing operation as well as improved embossed material and apparatus for manufacturing the same.

Another object of this invention is to provide an improved method of embossing material such that during the embossing operation the surface of the material to be embossed is more readily made to match and correspond to the embossing surface of the embossing tool employed.

Another object of this invention is to provide an improved rotary embossing operation.

Still another object of this invention is to provide an improved rotary embossing operation wherein plastic film or sheet material, supported or unsupported, to be embossed is pressed by means of a rotating pressing roll onto the embossing surface of a rotating embossing roll.

How these and other objects of this invention are accomplished will become apparent in the light of the accompanying disclosure and drawings wherein.

Figure 1:
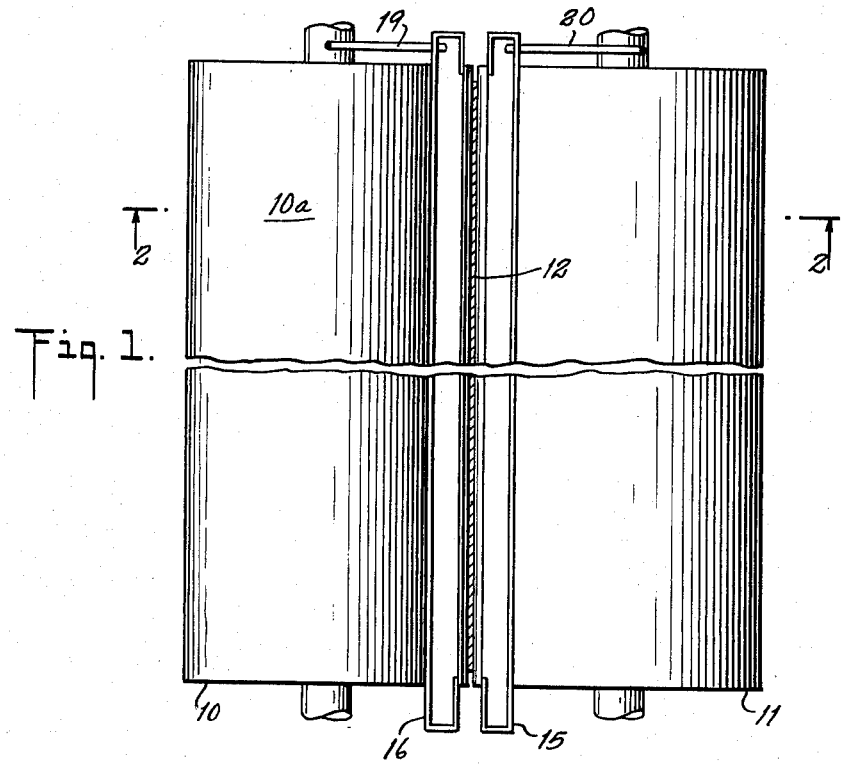
FIG. 1 is a plan view of an apparatus suitable for carrying out a practice of this invention.
Figure 2:
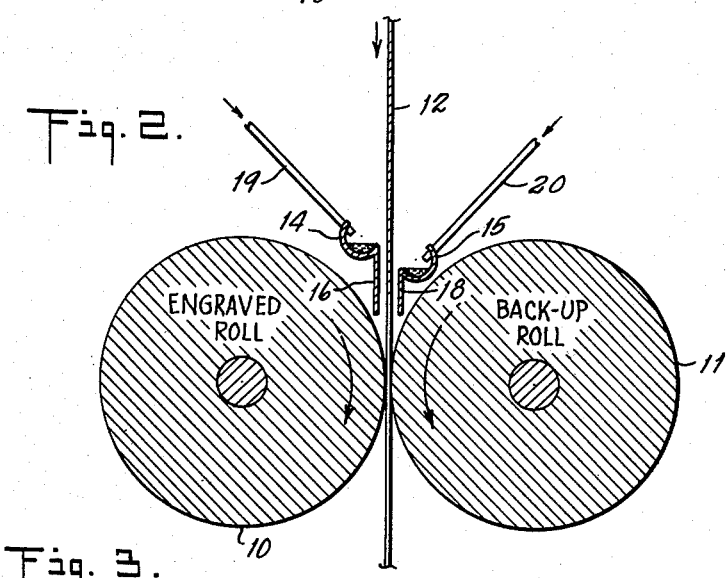
FIG. 2 is a cross sectional view taken along line 2—2 of FIG. 1.

In accordance with this invention an improved embossed material and embossing method are achieved by providing a layer or film of liquid upon the material to be embossed, such as by flowing a liquid onto the material to be embossed, during the embossing operation. More particularly, in accordance with this invention during an embossing operation wherein a relatively soft material to be embossed is brought into embossing contact with an embossing surface, an improved embossing operation is provided by flowing or wetting the material to be embossed with a liquid, such as an aqueous liquid, e.g., water, just prior to and/or during the embossing operation so that as the relatively soft material is embossed it is wetted or has flowing thereon a film of said liquid.

In accordance with one particular embodiment of this invention applicable to a rotary embossing operation wherein film or sheet material is passed between opposed surfaces of an embossing roll and a pressing or back-up roll under conditions such that said pressing or back-up roll presses said sheet material into embossing contact with the embossing surface of said embossing roll, an improved embossing operation is provided by flowing or directing onto said sheet material undergoing embossing a stream or flow of liquid, such as an aqueous liquid, e.g., water, or a non-aqueous liquid, e.g., a petroleum fraction such as kerosene or light, non-viscous lubricating oil fraction, substantially inert with respect to and a non-solvent for the sheet material undergoing embossing so that said sheet material is wetted by or has flowing thereon during the embossing operation said liquid applied thereto.

As indicated, any suitable, preferably volatile, liquid which is a non-solvent for the material being embossed may be employed in the practice of this invention. Particularly suitable as the wetting liquid is water or aqueous liquids such as water solutions containing additive materials dissolved therein, particularly surface active organic materials which serve to reduce the surface tension of water so that the aqueous liquid is better able to wet the surface of the material to be embossed. Other liquids such as non-aqueous liquids which may be employed in the practice of this invention include such liquids as hydrocarbon or petroleum liquids, e.g., kerosene, or the relatively high boiling, non-viscous, light lubricating oil fractions and the like as well as the relatively high molecular weight oxygenated hydrocarbons such as alcohols, esters, fusel oils and the like.

In the practice of the invention it is preferred that the liquid employed to flow upon the material to be embossed be applied to that surface of the material which is forced into embossing contact with the embossing surface of the embossing tool. If desired, however, the liquid applied to the material undergoing embossing may be applied thereto on the opposite or other surface thereof with respect to the embossed surface. It is preferred, however, in the practice of this invention to apply liquid, preferably the same liquid, to both surfaces, the surface to be embossed or undergoing embossing and the opposite or other surface of the material being embossed.

In accordance with one feature of this invention, particularly applicable to the embossing of thermoplastic or heat-sensitive materials wherein the embossing operation is carried out at a relatively high temperature, such as in a rotary embossing operation wherein the rotating embossing roll is maintained at an elevated temperature above about 250° F., e.g. about 325° F., the liquid is applied to the material to be embossed at a relatively low temperature, such as a temperature in the range about 50–300 degrees Fahrenheit, more or less, below the embossing temperature or the temperature at which the embossing roll is maintained during the embossing operation. For example, in the situation wherein the embossing roll is maintained or the embossing operation is carried out at a temperature of about 325° F. the liquid, e.g. water, applied to the material being embossed, particularly when it is applied to the surface of material brought into embossing contact with the embossing surface, is at a temperature in the range from about 70° F. to about 150° F.

In accordance with still another feature of the practice of this invention wherein a liquid is applied to the surface of the material brought into embossing contact with the embossing surface of the embossing tool additional liquid, the same or a different liquid, aqueous and/or non-aqueous or mixtures or emulsions thereof, is brought into contact with and caused to flow over the opposite or other surface of the material undergoing embossing. Desirably, in such instances the temperature of the liquid applied to the other or opposite side of the material being embossed is substantially lower than the temperature of the liquid applied to the embossed surface of the material, such as a temperature in the range 10–110 degrees Fahrenheit lower than the liquid applied to the embossed surface of the material. In such an operation it is seen that a temperature differential is maintained across the material being embossed during the embossing operation, the opposite or other side of the material being maintained at a temperature lower than the embossed side of the material.

In accordance with yet another feature of this invention, an improved embossing operation and an improved embossed product are obtained by applying the practices of this invention to be an embossing operation wherein relatively soft material is forced into embossing contact with the embossing surface of an embossing tool which is provided with holes or indentations therein. By applying the practices of this invention to an embossing operation employing such an embossing tool, during embossing contact the material being embossed is caused to more readily conform to the embossing surface and to flow into the surface holes or indentations provided on the embossing surface of the embossing tool, thereby yielding an embossed product more closely corresponding and substantially completely matching the embossing surface.

Exactly how the flow of liquid onto the material being embossed during the embossing operation causes the material being embossed to more readily and completely be formed to match and to conform to the embossing surface in contact therewith and/or to flow into the surface indentations or holes on the embossing surface, is not completely understood. It is speculated that the liquid serves as a lubricant to cause the material being embossed to more readily conform to the embossing surface. It is also speculated that the applied liquid serves also to aid in the separation of the resulting embossed material from the embossing surface upon completion of the embossing operation. It is further speculated that the temperature differential maintained across the opposite side or surfaces of the material being embossed, and particularly between the surface of the material being embossed and the embossing surface, further aids in causing the material to more readily conform to the embossing surface of the embossing tool and aids in the complete removal of the material from the embossing surface upon completion of the embossing operation.

In the instance where heat-sensitive or thermo-plastic material, such as plasticized vinyl resin, is the material being embossed it is speculated that the other, non-embossed surface of the material is maintained stronger than the surface being embossed. Accordingly, in the instance when the embossing surface is provided with a plurality of holes or indentations into which the material undergoing embossing is forced during the embossing operation, by maintaining the other surface of the material at a lower temperature than the embossed surface a more complete removal of the material from these surface holes or indentations is possible upon completion of the embossing operation with the result that the removed embossed material substantially exactly corresponds to the embossing surface of the embossing tool.

In accordance with yet another feature of the practice of this invention, improved embossing results and improved embossed products are obtainable by coating or depositing on or otherwise providing the embossing surface of the embossing tool with a film of surface active material, such as a hydrophobic (oleophilic) film. Particularly useful in accordance with this embodiment is an embossing surface which has deposited thereon a silicone or silicone-containing film to impart hydrophobic (oleophilic) surface properties to the embossing surface.

Referring now to the drawings, FIG. 1 thereof schematically illustrates the practice of this invention as applied to a rotary embossing operation wherein plastic (vinyl plastic) film or sheet material is passed between a rotating pressing or backup roll and a relatively hot, rotating engraving or embossing roll. As illustrated therein rotating embossing roll 10 and a rotating pressing roll 11 are positioned relative to each other such that as film 12, vinyl plastic-containing material, is continuously passed therebetween, film 12 is pressed by pressing roll 11 onto the embossing surface 10a of embossing roll 10. As film 12 is pressed against embossing surface 10a that side or surface of film 12 in contact with embossing surface 10a is embossed. The resulting embossed film is then continuously recovered by suitable means, not shown.

In accordance with this invention the aforesaid embossing operation is improved by flowing a suitable liquid such as water or an aqueous solution onto film 12 during the embossing operation. The flowing of liquid onto film 12 during the embossing operation is effected by means of troughs 14 and 15 which are provided on the edges thereof adjacent film 12 with depending lip plates or skirts 16 and 18, respectively, to effect a better distribution of the applied liquid onto film 12. Suitable liquid is supplied to troughs 14 and 15 by means of conduits 19 and 20, respectively.

Accordingly, in the practice of this invention during the embossing operation wherein film 12 is continuously supplied to the bite between embossing roll 10 and pressing roll 11 liquid is supplied via conduits 19 and 20 to troughs 14 and 15, respectively. The liquid fills and overflows from troughs 14 and 15 and flows along plates 16 and 18 onto film 12 on both sides thereof just as film 12 enters the bite between embossing roll 10 and pressing roll 11. During this operation a bank or body of liquid is maintained in contact with film 12 on either side thereof at about the position wherein film 12 contacts both embossing roll 10 and pressing roll 11 so that both sides of film 12 are thoroughly wetted or in contact with the liquid just as film 12 enters the bite between embossing roll 10 and pressing roll 11.

In a specific embodiment of the practice of this invention as applied to the embossing of unsupported vinyl plastic film, embossing roll 10 is a heated roll and is maintained at a temperature of about 325° F. and pressing roll 11, the surface of which is covered with a suitable resilient material such as rubber, is unheated. Relatively hot water at a temperature of about 85° F. is supplied via conduit 19 to trough 14 for flow upon that side of film 12 to be embossed. The amount of relatively hot water supplied via conduit 19 is adjusted so that substantially all of the water is vaporized or flashed from the embossed surface of film 12 just as it leaves the bite between embossing roll 10 and pressing roll 11 with the result that the embossed side of film 12 is dry, substantially immediately after embossing contact with embossing roll 10. Desirably, at the same time relatively cold water is supplied via conduit 20 to trough 15, the water supplied thereto being at a temperature of about 35–40° F. Sufficient water is supplied via conduit 20 and trough 15 into contact with the other side of film 12 which is in contact with the surface of pressing roll 11 to build up a bank or body of water in contact with this other surface of film 12 just as it enters the bite between embossing roll 10 and pressing roll 11.

As a result of supplying water to both sides of film 12 as film 12 enters the bite between embossing roll 10 and pressing roll 11 a sharp temperature differential is maintained across film 12 during embossing contact or the actual embossing operation, the embossed side of film 12 or that side of film 12 in contact with embossing surface 10a of embossing roll 10 is at a higher temperature than the other side of film 12 in contact with the surface of pressing roll 11. The temperature differential across film 12 during the embossing operation is usually in the range 10–90 degrees Fahrenheit, more or less, depending upon the temperature of the water supplied to both sides of film 12 during the embossing operation, the relative amounts of water supplied to either side of film 12 and the temperature at which embossing roll 10 is maintained or at which the embossing operation is carried out.

The practice of this invention is generally applicable to any embossing operation wherein relatively soft material is pressed into contact with a relatively hard embossing surface and, accordingly, is applicable to a rotary embossing operation as illustrated in FIG. 1 or to a plate-type operation wherein relatively soft material to be embossed is pressed between a usually flat embossing plate and a cooperating pressing plate. In a plate-type or non-rotary embossing operation the liquids or liquid are applied to the material to be embossed just prior to the actual embossing operation so that the material being embossed is wetted or has the applied liquids flowing thereon just as the material undergoes embossing contact with the embossing plate. If desired, the liquid applied in a rotary embossing operation, as described in connection with FIG. 1, may be sprayed upon the material to be embossed.

Figure 3:
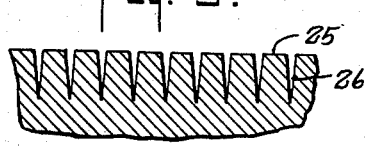
FIG. 3 is a fragmentary cross sectional view of the embossing surface of an embossing roll suitable for use in the embossing operation in accordance with this invention.

The practice of this invention is particularly applicable to an embossing operation employing an embossing tool having provided on the embossing surface thereof a plurality of surface holes or indentations, such as illustrated in FIG. 3 which discloses in cross section a fragment of an embossing surface wherein the embossing surface 25 is provided with a plurality of holes or surface indentations 26 which are substantially conical in shape. Although the surface indentations or holes 26 are illustrated as being substantially conical in shape, the holes may be cylindrical in shape or triangular or square in shape (cross section) or any other suitable shape or cross section.

The number of these surface indentations may be in the range 400–25,000, more or less, per square inch of the embossing surface and have a depth in the range 0.002–0.5 inch, more or less, and a surface diameter in the range 0.002–0.2 inch. An embossing surface of this type when pressed into embossing contact with relatively soft material forces the soft material to flow into the surface indentations or holes with the result that when the resulting embossed material is removed from the embossing surface there are formed on the embossed surface a plurality of separate, distinct and substantially vertically-extending fibers integral with the base embossed material. By this technique suede-like materials having the appearance and touch or feel of natural suede can be prepared from relatively inexpensive plastic materials, such as vinyl plastic. Suede-like materials would have a fiber density of 12,000–25,000 fibers per square inch, a fiber length in the range of 0.002–0.01 inch and a fiber base diameter in the range 0.002–0.02, the fibers being substantially conical in shape.

In accordance with yet another feature of this invention the liquid applied to the surface of the material to be embossed is applied as a film or layer thereon by directly printing or otherwise directly applying the liquid onto the surface of the material, either to completely cover the surface of the material or selected portions thereof. A suitable method of directly applying liquid to the surface of the material would be to employ a blotter-type plate or roll, the surface of the blotter-type plate or roll to be brought into contact with the material to be wetted, being wetted with the liquid such that when the blotter plate or roll is pressed against the surface of the material there is directly applied and deposited on the surface of the material a film or layer of the liquid. Subsequently, the resulting wetted material is then embossed in the usual manner with improved embossing results being effected on that portion or surface of the material upon which the liquid had been applied. This method of embossing is particularly applicable when it is desired to raise on the resulting embossed surface a plurality of separate, distinct and substantially vertically-extending fibers integral with the embossed material.

In accordance with yet still another feature of this invention improved embossing effects are achieved by carrying out the complete embossing operation in essentially two stages or in two embossing operations. In the first stage embossing operation the material to be embossed has flowed thereover during the embossing operation a suitable liquid such as an aqueous solution under conditions such that immediately and directly subsequent to this first stage embossing operation there is retained within the surface indentations or relatively low spots or portions of the resulting first stage embossed material a layer or film of the applied liquid. Excess applied liquid, such as any applied liquid on the other than desired surfaces or portions of the embossed material, such as relatively high portions thereof or other certain selected portions of the first stage embossed surface, high or low, is then removed. This excess liquid can be conveniently and readily removed from selected portions of the material by means of a doctor-blade or squeegee. Following the removal of the excess applied liquid the material is again embossed in a second stage embossing operation, this second stage embossing operation being particularly directed to those portions of the material having the film or layer of applied liquid thereon.

In accordance with yet still another feature of this invention involving a two stage embossing operation the first stage embossing operation is carried out in the usual manner without any applied liquid being present or flowing upon the material being embossed. Subsequent to this conventional first stage embossing operation liquid is then applied to the resulting embossed material to form a film or layer of the applied liquid on certain selected portions thereof. This liquid may be applied by direct application, such as by means of a blotter-type or roll, onto certain selected portions of the first stage embossed material or liquid may be applied to cover substantially all of the embossed material and then the excess liquid removed or wiped away by suitable means described hereinabove. The second stage embossing operation is then carried out upon those portions of the embossed materials containing a film or layer of the applied liquid with improved embossing results being effected at these selected portions. Those portions of the embossed material embossed in the second stage embossing operation tend to be more distinctive and to stand out in contrast to the other portions of the embossed material.

As will be apparent to those skilled in the art in the light of the accompanying disclosure many modifications, changes and substitutions are possible in the practice of this invention without departing from the spirit or scope thereof.

I claim:

1. In an embossing operation wherein a sheet of relatively soft plastic material is brought into contact with and between opposed surfaces of a rotating pressing roll and a cooperating rotating embossing roll provided with indentations on the surface thereof, the number of said surface indentations being in the range 400–25,000 per square inch of the surface of said embossing roll, said indentations having a depth in the range 0.002–0.5 inch and a surface diameter in the range 0.002–0.2 inch, the improvement which comprises flowing a film of a first liquid onto one surface of said sheet of plastic material just prior to bringing said one surface into contact with the surface of said embossing roll, said embossing roll being maintained at an elevated temperature above about 250° F., said first liquid applied to said plastic material being at a temperature in the range about 50–300 degrees Fahrenheit below the temperature at which said embossing roll is maintained, applying a second liquid to the other surface of said sheet of plastic material to be embossed just prior to the embossing operation, said first and second liquids being applied to said sheet of plastic material at about the location where said sheet material is brought into contact with said embossing and pressing rolls, the temperature of said second liquid being in the range of 10–110 degrees Fahrenheit lower than said first liquid applied to said one surface of said plastic sheet material brought into contact with the embossing roll, to maintain a temperature differential across the plastic sheet material during the embossing operation in the range 10–90 degrees Fahrenheit and pressing said one surface of said plastic sheet material against the surface of said embossing roll to force said plastic material into the surface indentations of the embossing roll so as to substantially completely occupy these indentations and removing the resulting embossed plastic sheet material from contact with said embossing roll.

2. A method in accordance with claim 1 wherein said plastic sheet material comprises polyvinyl chloride.

3. A method in accordance with claim 1 wherein said first and second liquids are aqueous liquids.

4. A method in accordance with claim 1 wherein the density of said surface indentations on the surface of said embossing roll is in the range 12,000–25,000 per square inch, wherein the depth of said indentations is in the range 0.002–0.01 inch and wherein the surface diameter of said indentations is in the range 0.002–0.01 inch.

References Cited by the Examiner
UNITED STATES PATENTS

| | | | |
|---|---|---|---|
| 2,370,827 | 3/45 | Weichbrodt et al. | 18—19 |
| 2,561,147 | 7/51 | Smith | 41—24 |
| 2,569,434 | 9/51 | Ischinger | 41—17 |
| 2,595,734 | 5/52 | Toulmin | 41—17 |
| 2,711,560 | 6/55 | Beckham | 18—19 |
| 2,779,387 | 1/57 | Schairer. | |
| 2,861,022 | 11/58 | Lundsager. | |
| 2,915,787 | 12/59 | Ewing et al. | 18—56 |
| 2,928,135 | 3/60 | Smith | 18—56 |
| 2,996,822 | 8/61 | Souza | 41—24 XR |

EARL M. BERGERT, *Primary Examiner.*
ARTHUR P. KENT, HAROLD ANSHER, *Examiners.*

UNITED STATES PATENT OFFICE
CERTIFICATE OF CORRECTION

Patent No. 3,176,058                          March 30, 1965

Emanuel Mittman

It is hereby certified that error appears in the above numbered patent requiring correction and that the said Letters Patent should read as corrected below.

Column 1, line 17, for "in" read -- is --; column 3, line 37, strike out "be"; line 62, for "side" read -- sides --; column 5, line 72, for "0.02" read -- 0.01 --; column 6, line 54, after "blotter-type" insert -- plate --; column 8, after line 28, insert the following:

3,027,595     4/62     Takai et al.-------264-284

Signed and sealed this 24th day of August 1965.

(SEAL)
Attest:

ERNEST W. SWIDER
Attesting Officer

EDWARD J. BRENNER
Commissioner of Patents